United States Patent
Kuroki et al.

(10) Patent No.: US 6,643,087 B1
(45) Date of Patent: Nov. 4, 2003

(54) DISK DRIVE WITH IMPROVED RETRACT CIRCUIT AND METHOD

(75) Inventors: Kenji Kuroki, Fujisawa (JP); Thomas R. Albrecht, San Jose, CA (US); Fuminori Sai, Yokohama (JP); Yuzo Nakagawa, Hiratsuka (JP); Nobuhisa Koide, Chigasaki (JP); Masashi Murai, Yamato (JP); Keishi Takahashi, Fujisawa (JP); Timothy C. Reiley, Losgatos, CA (US); Erno H. Klassen, Santa Clara, CA (US)

(73) Assignee: Hitachi Global Storage Technologies Netherlands B.V. (NL)

( * ) Notice: Subject to any disclaimer, the term of this patent is extended or adjusted under 35 U.S.C. 154(b) by 0 days.

(21) Appl. No.: 09/519,142

(22) Filed: Mar. 6, 2000

(30) Foreign Application Priority Data

Mar. 8, 1999  (JP) .......................... 11-059981

(51) Int. Cl.[7] ............................................. G11B 21/02
(52) U.S. Cl. ........................................................ 360/75
(58) Field of Search ................................. 360/75, 73.03, 360/78.04, 265.1; 318/127, 442, 445

(56) References Cited

U.S. PATENT DOCUMENTS

| | | | | |
|---|---|---|---|---|
| 4,237,501 A | * | 12/1980 | Barmache et al. ............ | 360/75 |
| 4,831,469 A | | 5/1989 | Hanson et al. | |
| 5,325,030 A | * | 6/1994 | Yamamura et al. ........ | 360/75 X |
| 5,504,402 A | * | 4/1996 | Menegoli .................. | 360/75 X |
| 5,543,986 A | * | 8/1996 | Albrecht .................. | 360/256.4 |
| 5,737,144 A | * | 4/1998 | Ataee et al. .................. | 360/75 |
| 6,016,234 A | * | 1/2000 | Blank et al. .................. | 360/75 |
| 6,025,968 A | * | 2/2000 | Albrecht ...................... | 360/75 |
| 6,064,539 A | * | 5/2000 | Null et al. .................... | 360/75 |
| 6,081,400 A | * | 6/2000 | Lu et al. ...................... | 360/75 |

FOREIGN PATENT DOCUMENTS

| | | |
|---|---|---|
| JP | 05-049291 | 2/1993 |
| JP | 08-249851 | 9/1996 |
| JP | 09-073744 | 3/1997 |

* cited by examiner

*Primary Examiner*—David Hudspeth
*Assistant Examiner*—Fred F. Tzeng
(74) *Attorney, Agent, or Firm*—G. Marlin Knight; Robert B. Martin; Bracewell & Patterson, L.L.P.

(57) ABSTRACT

A method and apparatus to provide a retract circuit that can correspond to the tendency toward miniaturization and low supply voltage. When drive supply voltage Vcc is applied, a retract circuit charges a retract condenser Cr with boosted voltage Vup, equal to three times Vcc, generated by a booster circuit. Then, if the drive supply voltage Vcc is cut off and a VCM driver stops, the retract circuit detects power-off with a power OFF sense circuit, and provides retract delay time by a retract delay circuit. Furthermore, when the retract delay time elapses after the drive power supply is turned off, the retract driver switches the switching circuits on, discharges the retract condenser, charged at the boosted voltage, supplies discharge current to a voice coil, and retracts the head assembly.

14 Claims, 5 Drawing Sheets

DISK DRIVE WITH IMPROVED RETRACT CIRCUIT AND METHOD

CROSS REFERENCE TO RELATED APPLICATION

This application claims priority from Japanese Patent Application 11-059981, filed Mar. 8, 1999 (MM/DD/YYYY), which is hereby incorporated by reference. The contents of the present application are not necessarily identical to the contents of the priority application.

BACKGROUND OF THE INVENTION

1. Technical Field

The present invention relates to a disk drive which reads and writes data to a disk recording medium, and a retract circuit and a retract method for retracting a head by driving a head actuator when a power supply is turned off.

2. Description of the Related Art

A conventional disk drive comprises a magnetic-media disk which acts as a data recording medium, a spindle motor which rotates the disk, a head assembly, a voice coil motor (VCM), and a card assembly, in which an MPU, a spindle driver, a VCM driver, and a retract circuit are mounted. A head slider is mounted in the head assembly, and includes a magnetoresistive read head which reads data from and writes data to the disk. The VCM driver rotates the head assembly by driving the VCM when a drive power supply is turned on. The head assembly and VCM configure a head actuator.

While the disk drive is turned on, the disk drive drives the head actuator with the VCM driver, advances the head slider over a data area of a rotating disk surface, and reads data from and writes data to the data area of the disk. Hereinafter, this process of reading and writing data will be referred to as "disk operation."

In conventional systems, the head slider floats above the disk surface when the disk is rotating, but touches the disk surface when the disk stops rotation. If the head slider touches a data area surface, a problem such as scratching of the data area may happen, and hence the head slider is retracted from the data area when the disk stops rotation.

A load/unload mechanism and a CSS (contact/start/stop) mechanism are used for advancing a head slider over a data area of a disk and retracting the head slider from over the data area.

The load/unload mechanism retracts the head slider by loading the head assembly on a ramp near the disk assembly, by rotating the head assembly toward the ramp, in a process called "loading." The mechanism also "unloads" the head assembly by rotating the head assembly toward the disk, off the ramp, and over the data portion of the disk. When loading, the head assembly rises on a slope of the ramp to a parking surface by sliding a ramp surface in the unload direction. When unloading, the head assembly descends on the slope in the load direction, and goes over the disk surface from there.

In addition, the CSS mechanism retracts the head slider to a retract area provided on the disk surface. The head slider contacts a surface of the retract area when the disk stops the rotation, and floats from the surface of the retract area when the disk starts the rotation again.

The head slider is retracted by the VCM driver when the drive power supply is turned on, but the power of the VCM driver is also turned off when the drive power supply is turned off, and hence the retract circuit retracts the head slider.

Retract circuits are disclosed in, for example, U.S. Pat. No. 5,486,957 to Albrecht (hereinafter Albrecht) and U.S. Pat. No. 4,831,469 to Hanson, et al. (hereinafter Hanson).

A retract circuit according to Albrecht retracts the head slider by rectifying back-EMF (electromotive force) of the spindle motor and supplying current, derived from this rectified voltage, to a voice coil. The spindle motor continues to rotate due to inertia of the disk for the time being without immediately stopping the rotation when the drive power supply is turned off, and hence continues to generate the back-EMF after the drive power supply is turned off. In this retract circuit, as the back-EMF increases, the larger retract current supplied to the voice coil increases. As the torque constant becomes large, the back-EMF becomes large. Similarly, the larger the power supply voltage supplied to the spindle motor, and the greater the rotor radius is, the larger the torque constant of the spindle motor is.

In addition, a retract circuit according to Hanson charges the condenser with the power supply voltage when the drive power supply is turned on, and retracts the head slider by supplying the discharge current of the condenser to the voice coil when the drive power supply is turned off. In the retract circuit according to Hanson, as the power supply voltage and capacity of the condenser increase, the retract current supplied to the voice coil increases.

Nevertheless, in connection with thinning and miniaturization of a disk drive and the tendency toward a lower voltage of the drive power supply, it becomes difficult to unload a head assembly to a ramp in any one of the conventional retract circuits described above.

For example, in a disk drive whose disk diameter is nearly 1 inch and power supply voltage is 3.3 V, it is difficult to unload a head assembly onto a ramp by any one of the conventional retract circuits. Since the back-EMF of a spindle motor in the 1" disk drive described above is small, i.e., nearly 1 V, it is not possible to secure sufficient retract current. In addition, since the capacity of a condenser which is sized for a 1" disk drive miniaturized is insufficient, it is not possible to secure the sufficient retract current even if this type of condenser is charged with 3.3 V.

SUMMARY OF THE INVENTION

It is therefore one object of the present invention to provide an improved disk drive which reads and writes data to a disk recording medium.

It is yet another object of the present invention to provide an improved retract circuit for a disk drive system.

It is yet another object of the present invention to provide an improved method for retracting a head in a disk drive system.

The foregoing objects are achieved as is now described. The preferred embodiment provides a retract circuit and a retract method which comprises a booster circuit for boosting power supply voltage when power is applied, a condenser charged at the boosted voltage by the booster circuit at that time, and a control circuit for discharging the condenser to supply discharge current to a coil of a head actuator by when the power is cut off. According to the preferred embodiment, sufficient power is thereby reserved to completely retract the head when the power is disconnected.

When drive supply voltage Vcc is applied, a retract circuit charges a retract condenser Cr with boosted voltage Vup, equal to three times Vcc, generated by a booster circuit. Then, if the drive supply voltage Vcc is cut off and a VCM driver stops, the retract circuit detects power-off with a power OFF sense circuit, and provides retract delay time by a retract delay circuit. Furthermore, when the retract delay time elapses after the drive power supply is turned off, the retract driver switches the switching circuits on, discharges the retract condenser, charged at the boosted voltage, supplies discharge current to a voice coil, and retracts the head assembly.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
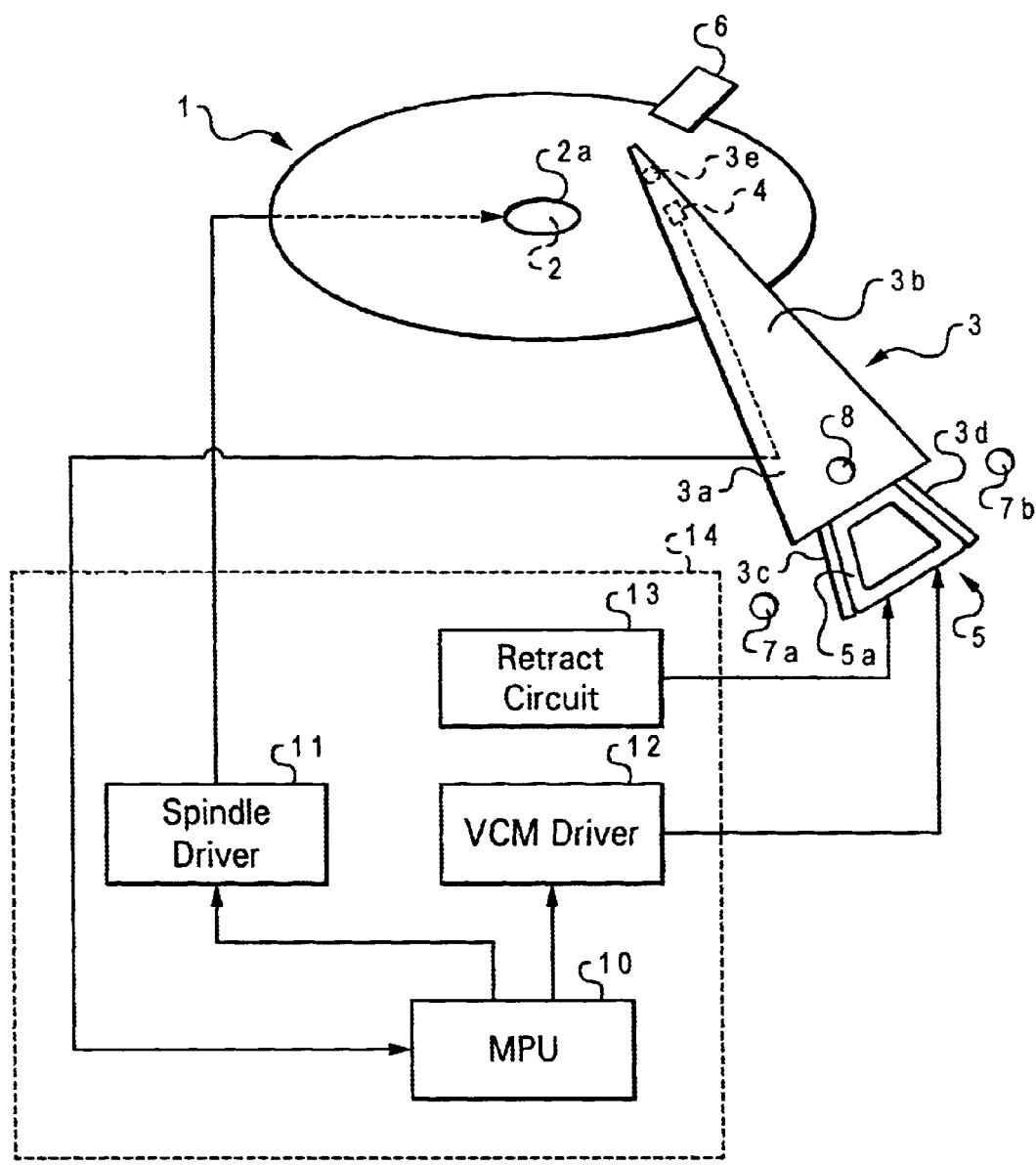
FIG. 1 depicts a a disk drive in accordance with a preferred embodiment of the present invention.

With reference now to the figures, and in particular with reference to FIG. 1, a structural drawing showing a disk drive according to an embodiment of the present invention is disclosed. The disk drive in FIG. 1 comprises a disk 1 that is a data recording medium, a spindle motor 2, a head assembly 3 including a head slider 4, a voice coil motor (VCM) 5, a ramp 6, and crash stops 7a and 7b, in a disk enclosure, not shown. In addition, the disk drive shown in FIG. 1, further comprises a card assembly 14, where an MPU 10, a spindle driver 11, a VCM driver 12, and a retract circuit 13 are mounted, in the outside of the disk enclosure. The power supply voltage of +3.3 V is supplied to the disk drive shown in FIG. 1. Of course, when specific figures or polarities for electrical characteristics or physical dimensions are used herein, persons of skill in the art will recognize that these exemplary figures can be changed to fit specific implementations.

Disk 1 is fixed to a spindle shaft 2a of the spindle motor 2. The diameter of disk 1 is nearly 1" or 27.4 mm. In addition, the spindle motor 2 rotates the disk 1 by being driven by the spindle driver 11.

The head assembly 3 is composed of an arm supporting portion 3a rotatably fitting with a pivot 8 being convexly provided in the disk enclosure, and a head arm 3b and coil arms 3c and 3d that extend in the direction opposite to the pivot described above. The head slider 4, which includes a head which reads and writes data to the disk 1 is mounted in the head arm 3b. In addition, the voice coil 5a is mounted in the coil arms 3c and 3d. This head assembly 3 swivels around the pivot 8, and moves the head slider 4 in the inward direction of the disk 1 (hereinafter, this is called the ID direction) or in the outward direction of the disk 1 (hereinafter, this is called the OD direction).

The VCM 5 is composed of the voice coil 5a, and a permanent magnet housed in the disk enclosure. This VCM 5 is driven by the VCM driver 12 or retract circuit 13, and swivels the head assembly 3. In addition, the head assembly 3 and VCM 5 configure the head actuator.

The ramp 6 is placed near the circumference of the disk 1, and supports the head arm 3b of the head assembly 3 when the head slider 4 is unloaded at the retract position. A convex portion 3e contacting and sliding a surface of the ramp 6 is provided at a tip portion of the head arm 3b. The head assembly 3, VCM 5, and ramp 6 configure a load/unload mechanism loading the head slider 4 over the disk 1 when it is rotating, and unloading the head slider 4 from over the disk 1 to the retract position.

The crash stops 7a and 7b are provided in the disk enclosure, and determines a swiveling range of the head assembly 3 by contacting the coil arms 3c and 3d.

The spindle driver 11 drives the spindle motor 2 according to an instruction from the MPU 10 when the drive power supply, which in the preferred embodiment is 3.3 V, is turned on. In addition, the VCM driver 12 drives the VCM 5 by supplying VCM current to the voice coil 5a according to an instruction from the MPU 10 when the drive power supply is turned on.

If the drive power supply is turned on, the MPU 10 rotates the disk 1 by controlling the spindle driver 11, swivels the head assembly 3 on the ramp 6 in the ID direction by controlling the VCM driver 12, and loads the head slider 4 over the disk 1. In addition, the MPU 10 is connected to the head embedded in the head slider 4, and controls disk operation when the drive power supply is turned on. Thus, the MPU 10 detects a position of the head on the basis of servo data read from a servo area of the disk 1 by the head, and makes the head seek on a desired track by controlling the VCM driver 12. Furthermore, the MPU 10 reads data from and writes data to a data area of this track with the head.

The MPU 10, spindle driver 11, and VCM driver 12 start operation when the drive power supply, which is also 3.3V in the preferred embodiment, is turned on, and stops operation when the drive power supply is turned off. Therefore, if the drive power supply is turned off, the spindle driver 11 stops the driving of the spindle motor 2, and the disk 1 stops rotation after the disk 1 rotates for the time being due to inertia. In addition, if the drive power supply is turned off, the VCM driver 12 stops driving the VCM 5.

If the drive power supply is turned off, the retract circuit 13 drives the VCM 5, swivels the head assembly 3 in the OD direction before the disk 1 stops rotation, and unloads the head slider 4 at the retract position.

Figure 2A:
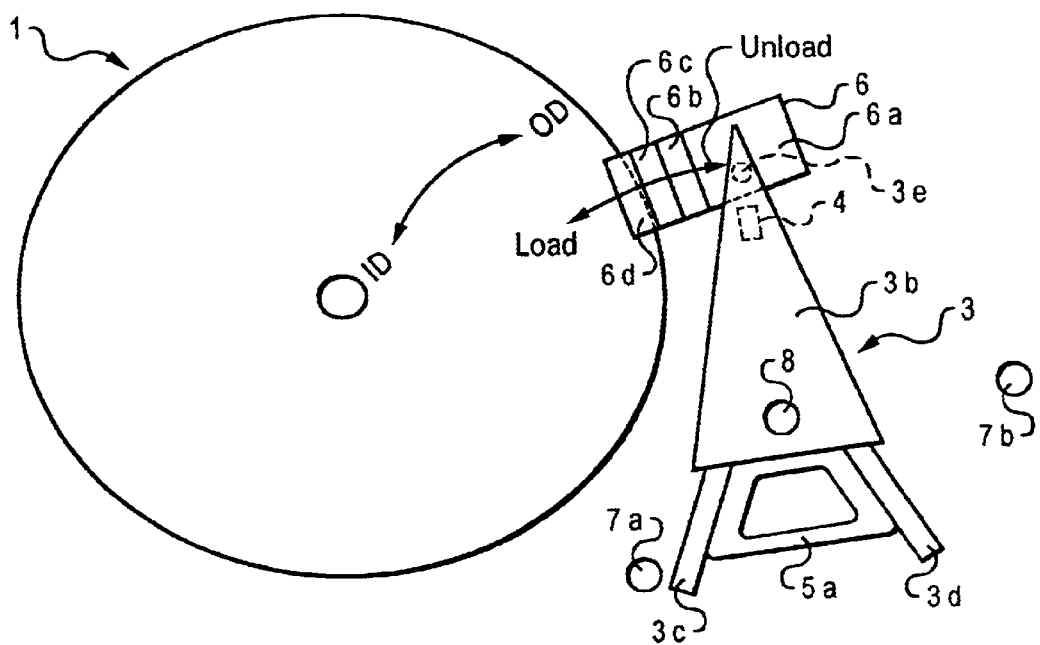
FIGS. 2(a) and 2(b) show a load/unload mechanism as used in the disk drive shown in FIG. 1, in accordance with a preferred embodiment of the present invention.
Figure 2B:
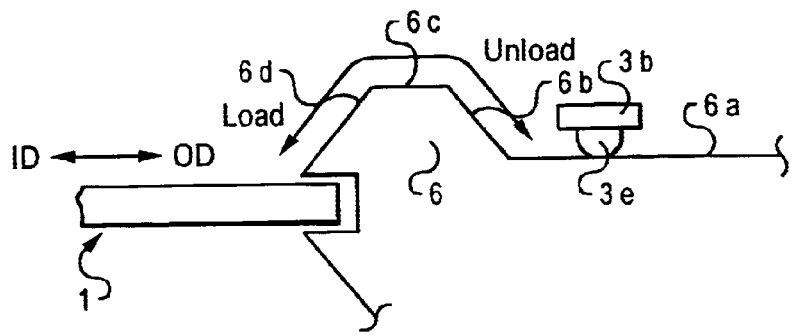

FIG. 2(a) and FIG. 2(b) are explanatory diagrams of the load/unload mechanism. FIG. 2(a) is a top view, and FIG. 2(b) is a cross-sectional view including the convex portion 3e, provided in the head arm 3b, and ramp 6. In FIG. 2a, the clockwise swiveling direction is the OD direction and unload direction, and the counterclockwise direction is the ID direction and load direction. FIG. 2(a) and FIG. 2(b) show such a state that the head slider 4 and head arm 3b are unloaded at the retract position. In addition, on the contrary, FIG. 1 shows such a state that the head slider 4 and head arm 3b are loaded over the disk 1.

The ramp 6 has a parking surface 6a, a slope 6b, a top surface 6c, and a slope 6d. When the head slider 4 and head arm 3b are unloaded at the retract position, the convex portion 3e contacts the parking surface 6a. In addition, coil arm 3c contacts the crash stop 7a, or is located near the position.

If the drive power supply is turned on and the disk 1 is rotated, the VCM 5 is driven by the VCM driver 12, the head arm 3b is swivelled in the load direction, and the head slider 4 is loaded over the disk 1 being rotating. At this time, the convex portion 3e slides on the surface of the ramp 6 in the load direction, and leaves from the slope 6d.

In addition, if the drive power supply is turned off, the VCM 5 is driven by the retract circuit 13, the head arm 3b is swivelled over the disk 1 in the OD direction and is further swivelled over the ramp 6 in the unload direction, and unloads the head slider 4 at the retract position. At time, the convex portion 3e contacts the slope 6d of the ramp 6, climbs the slope 6d in the unload direction, and slides on the top surface 6c and slope 6b to the parking surface 6a.

Figure 3:
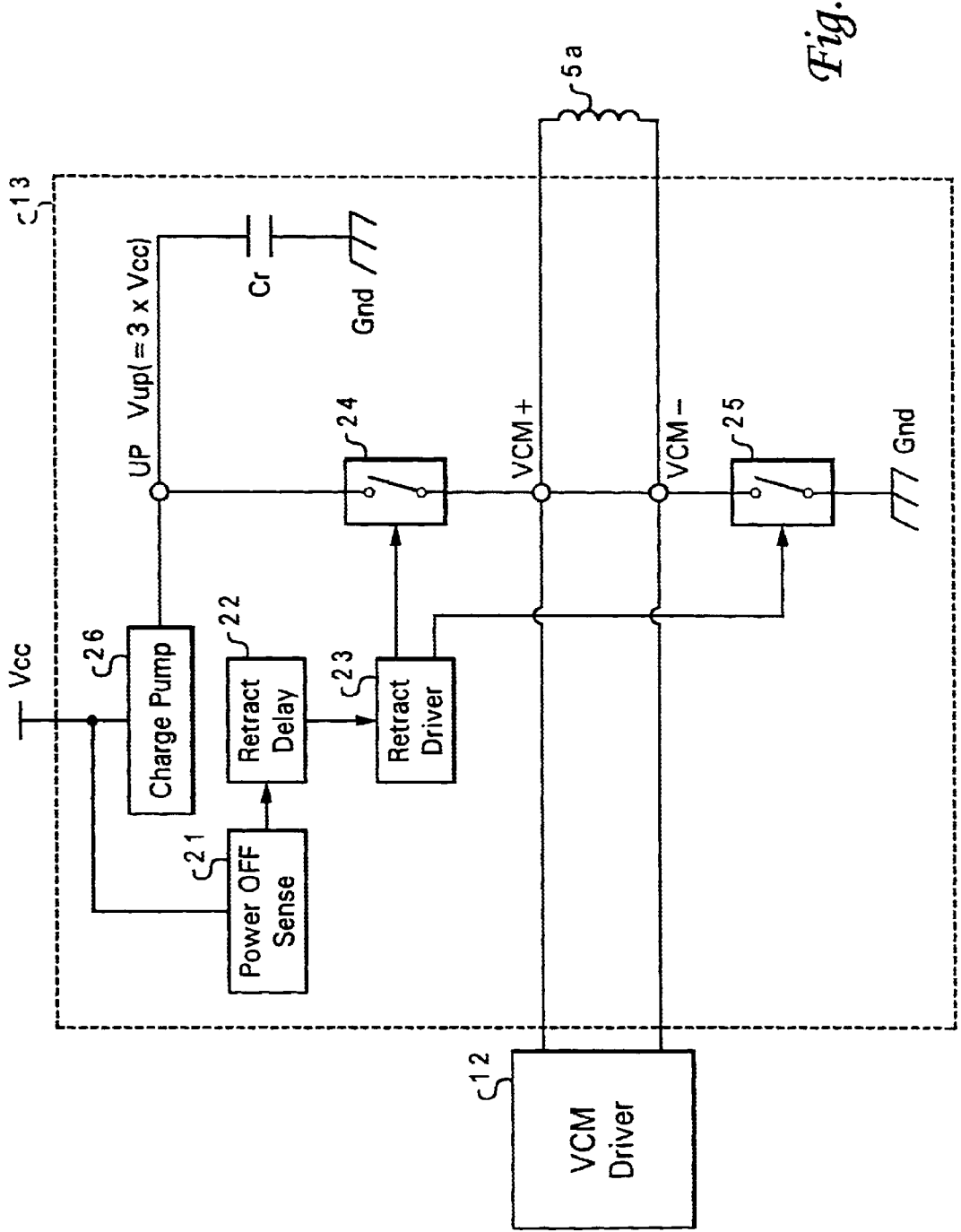
FIG. 3 is a block diagram of a retract circuit as used in the a disk drive as shown in FIG. 1, in accordance with a preferred embodiment of the present invention.

FIG. 3 is a block diagram of the retract circuit 13. In FIG. 3, the retract circuit 13 comprises a power OFF sense circuit 21, a retract delay circuit 22, a retract driver 23, switching circuits 24 and 25, a booster circuit 26, and a retract condenser Cr.

This retract circuit 13 charges the retract condenser Cr with charge pump voltage Vup that is generated by the booster circuit 26 and is nearly three times higher than the power supply voltage Vcc, when the power supply voltage Vcc (=3.3 V) is applied. Then, if the power supply voltage Vcc is cut off and the VCM driver 12 stops operation, the retract circuit 13 detects the power-off of the drive power supply by the power OFF sense circuit 21. Furthermore, the retract circuit 13 provides retract delay time Td for damping the angular momentum of the head assembly 3 due to inertia with using the retract delay circuit 22. Then, if the retract delay time Td elapses since the power supply voltage Vcc is cut off, the retract circuit 13 retracts the head assembly 3 by driving the VCM 5 through, making the retract driver 23 turn on the switching circuits 24 and 25, discharging the retract condenser Cr charged with the boosted voltage Vup, and supplying discharge current to the voice coil 5a. The power OFF sense circuit 21, retract delay circuit 22, retract driver 23, and switching circuits 24 and 25 configure a control circuit discharging the retract condenser Cr and supplying the discharging current the voice coil 5a when the power supply voltage Vcc is cut off.

The power OFF sense circuit 21 detects the power-off of the drive power supply, and activates the retract delay circuit 22.

If the drive power supply is cut off, the retract delay circuit 22 provides the retract delay time Td for damping the angular momentum of the head assembly 3 due to inertia. Then, if the retract delay time Td elapses since the drive power supply voltage is turned off, the retract delay circuit 22 activates the retract driver 23.

If the power supply voltage Vcc is cut off and the retract delay time Td elapses, the retract driver 23 turns on the switching circuits 24 and 25, charges the retract condenser Cr, supplies the discharge current to the voice coil 5a, and thereby retracts the head assembly 3 and head slider 4.

The switching circuit 24 is provided between a boosting terminal UP and a terminal VCM+ of the voice coil 5a, and the switching circuit 25 is provided between a terminal VCM− of the voice coil 5a and a ground Gnd. These switching circuits 24 and 25 are controlled by the retract driver 23, are turned off when the drive power supply is turned on, are turned on when the retract delay time Td elapses after the drive power supply is turned off, and thereby discharge the retract condenser Cr.

When the drive power supply is turned on, the booster circuit 26 generates the boosted voltage Vup (=3 Vcc) at the boosting terminal UP by nearly tripling the power supply voltage Vcc.

The retract condenser Cr, between the boosting terminal UP and the ground Gnd, is charged with the boosted voltage Vup (=3 Vcc) when the drive power supply is turned on. If the switching circuits 24 and 25 are turned on, the retract condenser Cr supplies discharge current as the retract current to the voice coil 5a.

Figure 4:
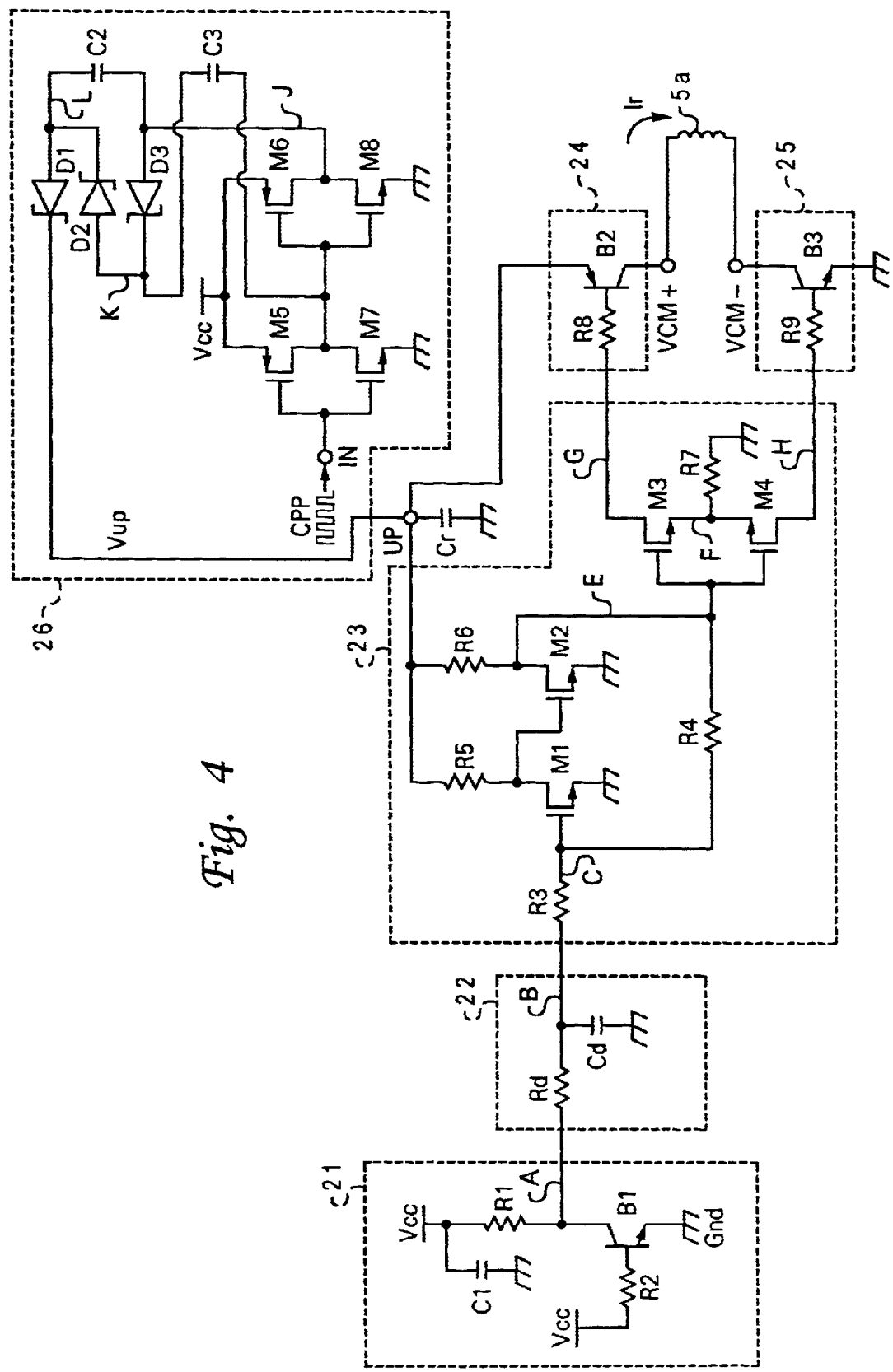
FIG. 4 is a schematic diagram showing an example of the retract circuit shown in FIG. 3, in accordance with a preferred embodiment of the present invention.

FIG. 4 is a schematic diagram showing an example of the retract circuit 13. In FIG. 4, the power OFF sense circuit 21 comprises a condenser C1 (=0.68 μF), resisters R1 (=10 kΩ) and R2 (=1 kΩ), and an NPN bipolar transistor B1. The condenser C1 is provided between a power supply line (voltage=3.3 V) and the ground Gnd, and the resister R1 is provided between the power supply line and a node A. The transistor B1 is turned on/off as the drive power supply is turned on/off. Furthermore, a base of the transistor B1 is connected to the power supply line through the input resister R2, a collector is connected to the node A, and an emitter does to the ground Gnd.

The retract delay circuit 22 is a CR integrating circuit determining the retract delay time Td, and is composed of a resister Rd (=1 MΩ) and a condenser Cd (=0.2 μF). The resister Rd is provided between the node A and a node B. The condenser Cd is provided between the node B and ground Gnd, and is charged according to a time constant Rd*Cd (here, R1 is disregarded because R1 is far smaller than Rd) if the power supply voltage Vcc is cut off.

The retract driver 23 comprises resisters R3 (=200 kΩ), R4 (=1 MΩ), R5 (=30 kΩ), R6 (=30 kΩ), and R7 (=1 kΩ), and nMOS transistors M1, M2, M3, and M4.

The resister R3 is provided between the node B and a node C, the resister R4 is between the node C and a node E, the resister R5 is between a node D and the boosting terminal UP, and the resister R6 is between the node E and boosting terminal UP. A gate of the transistor M1 is connected to the node C, a drain is to the node D (the boosting terminal UP through the resister R5), and a source is to the ground Gnd. A gate of the transistor M2 is connected to the node D (the drain of the transistor M1), a drain is to the node E (the boosting terminal UP through the resister R6, and the gate of the transistor M1 through the resister R4), and a source is to the ground Gnd.

In addition, the resister R7 is provided between a node F and the ground Gnd. Gates of the transistors M3 and M4 are commonly connected to the node E, and sources are commonly connected to the node F (the ground Gnd through the resister R7). A drain of the nMOS transistor M3 is connected to a node G, and a drain of the nMOS transistor M4 is to a node H.

The transistors M1 to M4 switch almost simultaneously when the power supply voltage Vcc is cut off and the retract delay time Td elapses. The resisters R3 to R6 and transistors M1 and M2 configure a Schmitt trigger circuit for switching the transistors M3 and M4 at a high speed according to a voltage level the node B.

The switching circuit 24 is composed of a PNP bipolar transistor B2 and a resister R8 (=16Ω). In addition, the switching circuit 25 is composed of an NPN bipolar transistor B3 and a resister R9 (=16Ω). The transistors B2 and B3 are turned on if the transistors M1 and M2 are turned on. A base of the transistor B2 is connected to the node G through the resister R8, an emitter is to the boosting terminal UP, and a collector is to the terminal VCM+ of the voice coil 5a. A base of the transistor B3 is connected to the node H through the resister R9, a collector is connected to the terminal VCM− of the voice coil 5a, and an emitter is connected to the ground Gnd.

The booster circuit 26 is a charge pump circuit, composed of condensers C2 (=0.033 $\mu$F), C3 (=0.033 $\mu$F), diodes D1, D2, and D3, pMOS transistors M5 and M6, and NMOS transistors M7 and M8.

Gates of the transistors MS and M7 are commonly connected to an input terminal IN of a charge pump pulse CPP, and drains are commonly connected to a node I. A source of the transistor M5 is connected to the power supply line, equal to the voltage Vcc, and a source of the transistor M7 is to the ground Gnd. In addition, gates of the transistors M6 and M8 are commonly connected to the node I (the drains of the transistors M5 and M7), and drains are commonly connected to a node J. A source of the transistor M6 is connected to the power supply line (=the voltage Vcc), a source of the transistor M8 is to the ground Gnd.

The condenser C3 is provided between the nodes I and K, and the condenser C2 is provided between the node J and a node L. In addition, an anode of the diode D3 is connected to the node J, and a cathode is to a node K. An anode of the diode D2 is connected to the cathode K, and a cathode is to the node L. An anode of the diode D1 is connected to the node L, and a cathode is to the boosting terminal UP.

The retract condenser Cr (60 $\mu$F) is provided between the boosting terminal UP and ground Gnd. This large capacity of retract condenser Cr is composed of two ferroelectric ceramic condensers connected in parallel. The ferroelectric ceramic condenser has a maximum voltage of 10 V and a capacity of 30 $\mu$F. The size of each ceramic condenser described above is 7 mm' 4 mm' 0.9 mm, in this embodiment. The two ceramic condensers are mounted in the card assembly 14.

Next, the operation of the retract circuit 13 shown in FIG. 4 will be described. First, the operation of the retract circuit 13 will be described when the drive power supply voltage Vcc is applied. In the power OFF sense circuit 21, the condenser C1 is charged at the voltage Vcc (=3.3V). In addition, the transistor B1. is turned on, and hence the potential of the node A is 0 V. Furthermore, in the retract delay circuit 22, the potential of the node B is 0 V. Therefore, current does not flow in the resister Rd, and hence the voltage between terminals of the condenser Cd is 0 V.

In addition, in the retract driver 23, the potential of the node C is 0 V. Therefore, the transistor M1 is kept off. Since the transistor M1 is turned off, the potential of the node D is the boosted voltage Vup (=9.9 V). Therefore, the transistor M2 is turned on. Since the transistor M2 is turned on, the potential of the node E is 0 V. Since the node E is at 0V, the transistors M3 and M4 are turned off, and hence the potential of the node F is 0 V. In addition, since base current does not flow through the transistors B2 and B3 in the switching circuits 24 and 25, the transistors B2 and B3 stay turned off.

The booster circuit 26 performs boosting operation when the power supply voltage Vcc is applied, that is, generates the boosted voltage Vup at the boosting terminal UP by boosting the power supply voltage Vcc (=3.3 V), and charges the retract condenser Cr with the boosted voltage Vup (=3' Vcc).

Hereinafter, the boosting operation of the booster circuit 26 will be described. First, when the drive power supply voltage Vcc is applied and the charge pump pulse CPP having a level "H" is input, the transistor M5 is turned off, the transistor M7 is turned on, and hence the potential of the node I becomes 0 V. Since the node I becomes at 0 V, the transistor M6 is turned on, the transistor M8 is turned off, and hence the potential of the node J becomes at the voltage Vcc. Since the node I is at 0 V and the node J becomes at the voltage Vcc, the diode D3 is turned on, the potential of the node K becomes the voltage Vcc, and hence the voltage between the terminals of the condenser C3 is charged up to the power supply voltage Vcc. In addition, assuming that the voltage between the terminals of the condenser C2 was 0 V before the drive power supply voltage Vcc is applied, the diode D2 is turned on since the node K moves to the voltage Vcc. Furthermore, the potential of the node L becomes the voltage Vcc, and the voltage between the terminals of the condenser C2 is charged up to the voltage Vcc. Moreover, with assuming that the voltage between the terminals of the retract condenser Cr was 0V before the drive power supply is turned on, the diode D1 is turned on since the node L becomes at the voltage Vcc. In addition, the potential of the boosting terminal UP becomes the voltage Vcc, and hence the voltage between the terminals of the retract condenser Cr is charged up to the voltage Vcc.

Next, if the charge pump pulse CPP is changed from the level "H" to a level "L," the transistor M5 is turned on, the transistor M7 is turned off, and hence the potential of the node I rises to the voltage Vcc. In addition, the transistor M6 is turned off, the transistor M8 is turned on, and the potential of the node J falls to 0 V. Since the voltage between the terminals of the condenser C3 is the voltage Vcc if the potential of the node I rises to the voltage Vcc, the potential of the node K rises to the potential of 2 Vcc. If the potential of the node K rises to the potential of 2 Vcc, the diode D3 is turned off, and the diode D2 is turned on. Since the diode D2 is turned on, the potential of the node L rises to the potential of 2 Vcc, the voltage between the terminals of the condenser C2 is charged up to the voltage of 2 Vcc, and the diode D1 is turned on. Since the diode D1 is turned on, the potential of the boosting terminal UP rises to the potential of 2 Vcc, and the voltage between the terminals of the retract condenser Cr is charged up to the voltage of 2 Vcc.

Next, if the charge pump pulse CPP returns from the level "L" to the level "H," the potential of the node I falls to 0 V, and the potential of the node J rises to the voltage Vcc. When the potential of the node I falls to 0V and the node J rises to the voltage Vcc, the potential of the node K falls and the diode D3 is turned on. Since the diode D3 is turned on, the potential of the node K is kept at the voltage Vcc. The voltage between the terminals of the condenser C3 is stays at the voltage Vcc. In addition, when the potential of the node J rises to the voltage Vcc, the potential of the node L rises to the potential of 3 Vcc since the voltage between the terminals of the condenser C2 is 2 Vcc. When the potential of the node L rises to the potential of 3 Vcc, the diode D2 is turned off, and the diode D1 is turned on. Since the diode D1 is turned on, the potential of the boosting terminal UP rises to the potential Vp (=3 Vcc), and the voltage between the terminals of the retract condenser Cr is charged up to the voltage Vp.

Next, if the charge pump pulse CPP again is changed from the level "H" to the level "L," the potential of the node I rises to the voltage Vcc, and the potential of the node J falls to 0V. When the potential of the node I rises to the voltage Vcc, the potential of the node K rises to the voltage 2 Vcc. When the potential of the node J falls to 0V and the potential of the node K rises to the voltage 2 Vcc, the diode D3 is turned off, the potential of the node L falls, the diode D2 is turned on, and the diode D1 is turned off. Since the diode D2 is turned on, the potential of the node L is kept at the voltage 2 Vcc. The voltage between the terminals of the condenser C2 is kept at the voltage 2 Vcc.

Next, if the charge pump pulse CPP again returns from the level "L" to the level "H," the potential of the node I falls to 0V, and the potential of the node J rises to the voltage Vcc. When the node I falls to 0V and the potential of the node J rises to the voltage Vcc, the diode D3 is turned on, and the potential of the node K is kept at the voltage Vcc. In addition, when the potential of the node J rises to the voltage Vcc, the potential of the node L rises to the voltage 3 Vcc, and the diode D1 is turned on. Since the diode D1 is turned on, the potential of the boosting terminal UP is kept at boosted voltage Vup (=3 Vcc), and hence the voltage between the terminals of the retract condenser Cr is kept at the boosted voltage Vup.

After this, the operation at the time when the charge pump pulse CPP again changes from the level "H" to the level "L" and the operation at the time when the charge pump pulse CPP again returns from the level "L" to the level "H" are repeated alternately. Therefore, the potential of the boosting terminal UP (the voltage between the terminals of the retract condenser Cr) is kept at the boosted voltage Vup (=3 Vcc).

Next, the operation of the retract circuit 13 shown in FIG. 4 at the time when the drive power supply voltage Vcc is cut off will be described. When the drive power supply is turned off, potentials of the nodes I and J both become 0V, the potential of the node L becomes equal to or lower than the voltage 2 Vcc, and hence the diode D1 is turned off. The potential of the boosting terminal UP is kept at the boosted voltage Vup (=3 Vcc), and hence the voltage between the terminals of the retract condenser Cr is kept at the boosted voltage Vup. In addition, if the power supply voltage Vcc is cut off, the transistor B1 is turned off in the power OFF sense circuit 21. When the transistor B1 is turned off, the potential of the node A rises by the discharge current from the condenser C1. The discharge current flows through the resister Rd and charges the condenser Cd in the retract delay circuit 22. Owing to this, the potential of the node B rises.

As the potential of the node B rises, the potential of the node C also rises in the retract driver 23. Then, when the potential of the node C becomes equal to or more than a threshold value of the transistor M1, the transistor M1 is turned on. When the transistor M1 is turned on, the potential of the node D falls to 0V, and the transistor M2 is turned off. When the transistor M2 is turned off, the potential of the node E rises nearly to the voltage of 3 Vcc, and the transistors M3 and M4 are turned on.

When the transistors M3 and M4 are turned on, in switching circuit 24, the base current of the transistor B2 flows, and hence the transistor B2 is turned on. In addition, the potential of the nodes F and H rises nearly to a voltage of 3 Vcc, the voltage equal to the node G. Because of this, in switching circuit 25, the base current of the transistor B3 also flows, and hence the transistor B3 also is turned on.

When the transistors B2 and M3 are turned on, the retract condenser Cr starts discharging. This discharge current is supplied to the terminal VCM+ of the voice coil 5a as retract current Ir, and flows from the terminal VCM− to the ground Gnd. The VCM 5 is driven by this retract current Ir. Then, by the drive of the VCM 5, the head arm 3b of the head assembly 3 swivels over the disk 1, rotating with inertia, in the OD direction, climbs the slope 6d of the ramp 6 in the unload direction, and reaches the parking surface 6a. Hence, the head slider 4 is retracted (unloaded) at the retract position.

In this manner, when the drive power supply voltage Vcc is applied, the retract circuit 13 charges the retract condenser Cr with the boosted voltage Vup (=3 Vcc) by boosting the power supply voltage Vcc by the booster circuit 26. Furthermore, when the drive power supply voltage Vcc is cut off, the retract circuit 13 drives the VCM 5 by discharging the retract condenser Cr and supplying the discharge current to the voice coil 5a. Therefore, it is possible to supply the large retract current to the voice coil 5a even if a low-voltage, small and thin disk drive such as a disk drive of this embodiment (3.3-V power supply, and 1"-disk) has only a low power supply voltage. Hence, it is possible to retract the head arm 3b on the ramp 6.

In addition, although the booster circuit 26 is composed of a charge pump circuit in FIG. 4, the booster circuit 26 can be composed of a DC-DC converter comprising a step-up transformer.

As the retract condenser Cr, it is necessary to select a condenser, which is small in size and large in capacity, so as to be able to be mounted in the small card assembly 14 and to surely output the discharge current that can retract the head arm 3b on the ramp 6. In addition, since the DC resistance of the voice coil 5a is small, that is, nearly 16Ω, it is necessary to select a condenser having small DC resistance as the retract condenser Cr. As a condenser fulfilling these requirements, there is a tantalum condenser besides the ceramic condenser described above.

Since a torque constant of the VCM 5 is small, that is, 0.002 Nm/A in the disk drive of this embodiment (3.3-V power supply and 1"-disk), it is necessary to supply the large retract current to the voice coil 5a. Nevertheless, since a torque constant of the spindle motor 2 also is small, that is, 0.0024 Nm/A, the back-e.m.f. of the spindle motor 2 is small, that is, nearly 1 V. Because of this, a conventional retract circuit as described in Albrecht cannot supply the retract current, which is enough to retract the head arm 3b on the ramp 6, to the voice coil 5a.

In addition, since the disk drive of this embodiment charges the retract condenser Cr with the boosted voltage Vup by the booster circuit 26, it is possible to reduce the capacity of the retract condenser in comparison with a case that a conventional retract circuit as described in Hanson charges a retract condenser with power supply voltage. The discharge current of the retract condenser Cr is proportional to its capacity, and is also proportional to charging voltage. Therefore, so as to flow the same discharge current as that in the retract circuit 13 of this embodiment in the retract circuit as described in Hanson, it is necessary to make the capacity of the retract condenser three times the capacity of the retract condenser Cr (=60 µF) in this embodiment. Nevertheless, it is difficult to implement such large capacity of condenser (=60*3 µF) in a small card assembly of a 1"-disk disk drive.

In the retract circuit 13 shown in FIG. 4, the Schmitt trigger circuit in the retract driver 23 positively feeds back the potential increase of the node E to the node C through the resister R4. When, owing to this Schmitt trigger circuit, the potential of the node C rises to a threshold value of the transistor M1, the nMOS transistors M1 and M2 switch instantly, the potential of the node E abruptly rises, and the nMOS transistors M3 and M4 are instantly turned on. In addition, when the transistors M3 and M4 are turned on, the transistors B2 and B3 are instantly turned on, and the retract condenser Cr starts discharging. Thus, the retract is started.

Therefore, the retract delay time Td that is the time from the cut-off of the drive power supply voltage Vcc to the start of discharging of the retract condenser Cr is determined by the time necessary for the potential of the node C to rises to the threshold value of the transistor M1. Thus, the retract delay time Td is set with the time constant of the retract delay circuit 22, Rd' Cd.

It is possible to start the retract at the same time of the cut-off of the drive power supply without providing the retract delay described above. The retract delay described above is provided so as to more safely retract (unload) the head arm 3b and head slider 4.

If the retract delay is not provided and the power supply voltage Vcc is cut off when the head assembly 3 seeks in the ID direction, most of the discharge energy (discharge current) of the retract condenser Cr is consumed for canceling the angular momentum of the head assembly 3 in the ID direction. Therefore, it may happen that the retract condenser Cr cannot supply the angular momentum in the OD direction, which is enough to climb the slope of the ramp 6, to the head assembly 3. In addition, if the power supply voltage Vcc is cut off when the head assembly 3 seeks in the OD direction, the inrush speed of the head assembly 3 to the ramp 6 becomes excessively large due to this angular momentum in the OD direction. Therefore, the coil arm 3c bumps the crash stop 7a and greatly rebounds, and, in the worst case, the head arm 3b may fall on the disk 1 from the ramp 6.

Even if the drive power supply voltage Vcc is cut off when the head assembly 3 seeks in the ID or OD direction and the VCM driver 12 stops operation, the head assembly 3 swivels in a seek direction due to inertia for the time being without stopping. Furthermore, in some case, the coil arm 3d bumps the crash stop 7b and rebounds in the OD direction, or, in another case, while the convex portion 3e of the head arm 3b bumps the ramp 6 and rebounds in the ID direction, the angular momentum of the swiveling motion caused by the inertia is gradually damped, and the head assembly 3 stops swiveling.

According to the preferred embodiment, it is possible to make the angular momentum of the head assembly 3 at the time of retract start always small by providing the retract delay, described above, by the retract delay circuit 22. Owing to this, it becomes possible for the head arm 3b to always climb the slope of the ramp 6 and to prevent the coil arm 3c from greatly rebounding due to bumping the crash stop 7a. Therefore, it is possible to more safely retract (unload) the head arm 3b and head slider 4.

Timing of starting the discharge of the retract condenser Cr (timing of starting the retract) is set at such an interval that starts from the time when the angular momentum of the head assembly 3 due to inertia is damped in some measure due to the retract delay time Td in comparison with that at the time of power cut-off, and ends at the time when the disk 1 stops rotation caused by inertia. An interval from the cut-off of the drive power supply to the stop of the swiveling of the head assembly 3 due to inertia is proportional to the moment of inertia of the head actuator. In addition, an interval that starts from the time when the drive power supply is turned off and ends at the time when the disk 1 stops rotation caused by inertia is proportional to the moment of inertia of the disk 1. In addition, the rotational speed of the disk 1 at the time when the power supply is turned off is faster than the swiveling speed of the head assembly 3 at the time when the head assembly 3 seeks. Therefore, usually, the time necessary until the disk 1 stops the rotation is longer than the time necessary until the head assembly 3 stops swiveling.

The moment of inertia of the head actuator, according to this embodiment, is $1*10^{-8}$ kgm$^2$, and the interval that starts from the time when the drive power supply is turned off and ends at the time when the swiveling speed of the head assembly 3 becomes sufficiently slow is nearly 50 ms. In addition, the interval that starts from the time when the drive power supply is turned off and ends at the time when the disk 1 stops the rotation is nearly 500 ms. Therefore, in a 1"-disk disk drive, it is desirable to set the retract delay time Td at 50–100 ms according to the time constant of the retract delay circuit 22, Rd*Cd. In addition, the interval that starts from the time when the drive power supply is turned off, and ends at the time when the swiveling speed of the head assembly 3 becomes sufficiently slow, and the time necessary for the disk 1 to stop the rotation, depend on the moment of inertia of the head actuator and disk 1. Hence, retract delay time is set according to these moment of inertia. For example, in a 2.5"-disk disk drive, it is desirable to set the retract delay time Td at 500 ms.

Figure 5A:
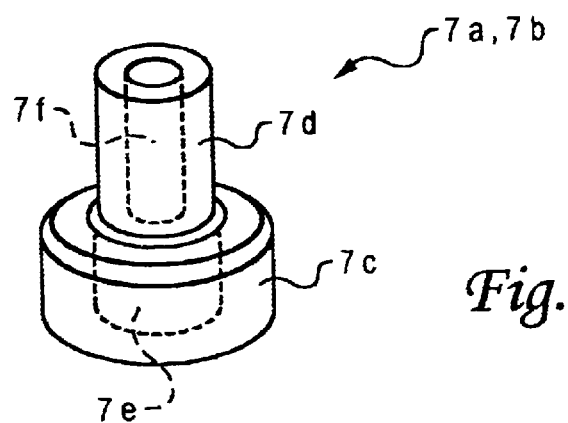
FIGS. 5(a) and 5(b) is an explanatory diagram of the configuration of a crash stop in the disk drive shown in FIG. 1, in accordance with a preferred embodiment of the present invention.
Figure 5B:
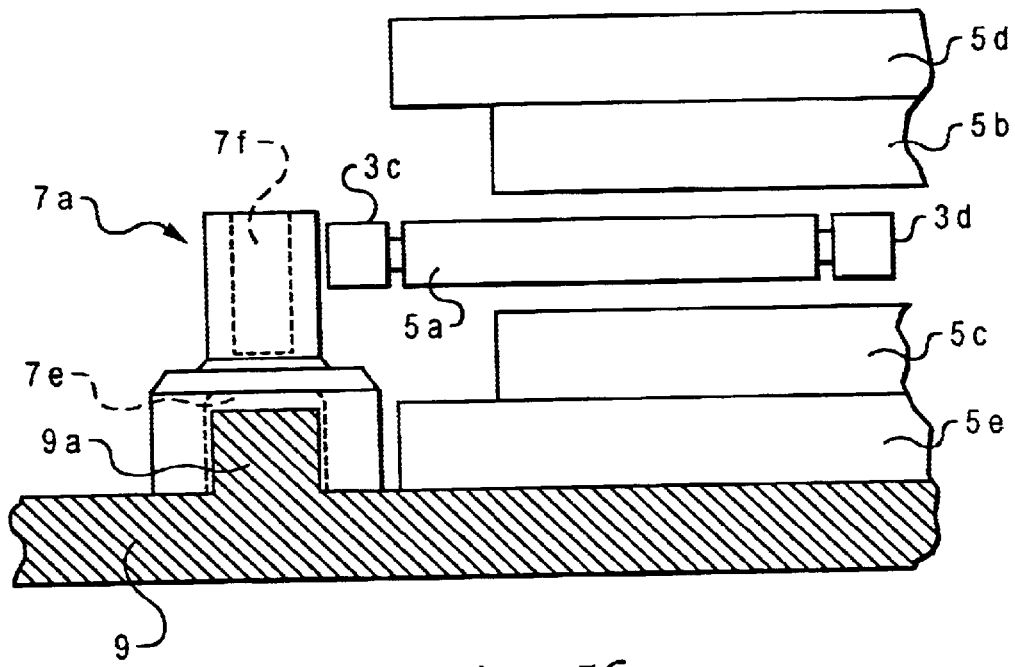

FIGS. 5(a) and 5(b) are structural drawings of the crash stops 7a and 7b. FIG. 5(a) is a perspective view of the crash stop 7a or 7b, and FIG. 5(b) is a cross-sectional structural view of where the crash stop 7a is mounted and its vicinity of a disk drive. In FIG. 5(b), reference symbol 5b shows a permanent magnet provided under an upper yoke 5d, and 5c shows a permanent magnet provided on a lower yoke 5e. The permanent magnets 5b and 5c and yokes 5d and 5e configure the VCM 5 with the voice coil 5a. In addition, reference number 9 shows a disk enclosure, and 9a does a convex portion provided in the disk enclosure.

In FIGS. 5(a) and 5b, the crash stops 7a and 7b are made of fluororubber, and is made by performing integrated formation of a stop cylindrical portion 7d, whose diameter is smaller than that of the support cylindrical portion 7c, on the support cylindrical portion 7c. A hollow portion 7e is provided in the support cylindrical portion 7c for being fixed to the disk enclosure 9. In addition, a hollow portion 7f for decreasing a rebound modulus of the head assembly 3 is provided in the stop cylindrical portion 7d. Here, the rebound modulus means a ratio of the swiveling speed of the head assembly 3 just after being rebounded back by a crash stop to the swiveling speed of the head assembly 3 just before bumping the crash stop.

The crash stops 7a and 7b are provided by fitting the hollow portion 7e, provided in the support cylindrical portion 7c, with the convex portion 9a of the disk enclosure 9 as in FIG. 5. When the head assembly 3 swivels in the OD direction and the head arm 3b slides on the parking surface 6a of the ramp 6 (see FIGS. 2(a) and 2b) in the OD direction, the coil arm 3c bumps the crash stop 7a, and the head assembly 3 rebounds in the ID direction. In addition, when the head assembly 3 swivels over the disk 1, which is rotating, in the ID direction and the head arm 3b approaches the center of the disk 1, the coil arm 3d bumps the crash stop 7b and the head assembly 3 rebounds in the OD direction.

In order to safely retract the head arm 3b on the ramp 6, it is desirable for each rebound modulus at the crash stops 7a and 7b to be as small as possible, for example, 0.8 or less.

In the disk drive of this embodiment, fluororubber that has a large elastic modulus and does not raise dust in the disk enclosure 9 is used, the hollow portion 7f is provided in the stop cylinder portion 7d, and hence the stop cylinder portion 7d made of polyurethane rubber can greatly deform when the coil arms 3c and 3d bump the stop cylinder portion 7d. It is possible to make the rebound modulus at the crash stops 7a and 7b be 0.8 or less. Therefore, the head arm 3b never falls on the disk 1 because the coil arm 3c of the head assembly 3, which is retracted on the ramp 6, bumps the crash stop 7a and rebounds. In addition, if the coil arm 3d of the head assembly 3, which swivels in the ID direction due to inertia just after the drive power supply is turned off, bumps the crash stop 7b, it is possible to rapidly reduce the swiveling speed of the head assembly 3.

As described above, according to this embodiment of the is present invention, it is possible to retract the head arm 3b on the ramp 6 since large retract current can be supplied to the voice coil 5a even in a small and thin disk drive having low power supply voltage, by charging the retract condenser Cr with the boosted voltage Vup (=3 Vcc) generated by the booster circuit 26 when the drive power supply voltage Vcc is applied, discharging the retract condenser Cr by the power OFF sense circuit 21, retract delay circuit 22, retract driver 23, and switching circuits 24 and 25 when the drive power supply is turned off, and supplying this discharge current as the retract current to the voice coil 5a.

As described above, according to the present invention, it is possible to securely retract a head since large retract current can be supplied to a coil even in a small and thin disk drive having low power supply voltage, by charging a condenser with boosted voltage generated by a booster circuit when a power supply is turned on, discharging the condenser by a control circuit when the power supply is turned off, and supplying this discharge current to a coil of a head actuator.

While the invention has been particularly shown and described with reference to a preferred embodiment, it will be understood by those skilled in the art that various changes in form and detail may be made therein without departing from the spirit and scope of the invention.

What is claimed is:

1. A retract circuit for retracting a head assembly of a disk drive after a power supply to said disk drive has been turned off, said retract circuit comprising:

a booster circuit capable of boosting a power supply voltage when said power supply is turned on;

a condenser, connected to said booster circuit; and a control circuit for allowing said condenser to be charged by said booster circuit with a boosted supply voltage when said power supply is turned on, and for allowing said condenser to discharge a discharge current to a coil within a head actuator of said disk drive, when said power supply is turned off, to retract a head assembly of said disk drive such that said head assembly is retracted even after said power supply has been turned off.

2. The retract circuit of claim 1, wherein said control circuit sets a delay time for damping any momentum caused by an inertia of said head actuator before discharging said condenser has started and after said power supply has been turned off.

3. The retract circuit of claim 1, wherein said condenser is a ceramic condenser.

4. The retract circuit of claim 1, wherein said booster circuit is a charge pump circuit.

5. The retract circuit of claim 1, wherein said boosted voltage is approximately three times of said power supply voltage.

6. A disk drive comprising:

a disk recording medium;

a head assembly having a magnetoresistive head capable of reading data from and writing data to said disk recording medium;

a voice coil motor for swiveling said head assembly; and a retract circuit for retracting said head by driving said voice coil motor when a power supply for said disk drive is turned off, wherein said retract circuit includes a booster circuit capable of boosting a power supply voltage when said power supply is turned on;

a condenser connected to said booster circuit; and a control circuit for allowing said condenser to be charged by said booster circuit with a boosted supply voltage when said power supply is turned on, and for allowing said condenser to discharge a discharge current to a coil within a head actuator of said disk drive, when said power supply is turned off, to retract a head assembly of said disk drive such that said head assembly is retracted even after said power supply has been turned off.

7. The disk drive of claim 6, wherein said disk drive further includes a ramp for supporting said head assembly when said head is being retracted, and wherein said retract circuit unloads said head assembly to said ramp when said power supply is turned off.

8. The disk drive of claim 6, wherein said disk drive further includes crash stops for determining a swivelling range of said head assembly, and wherein each of said crash stops has a rebound modulus of 0.8 or less at the time when said head assembly bumps one of said crash stops.

9. The disk drive of claim 6, wherein said control circuit sets a delay time for damping any angular momentum caused by an inertia of said head assembly before discharging of said condenser has started and after said power supply has been turned off.

10. The disk drive of claim 6, wherein said boosted voltage is approximately three times of said power supply voltage.

11. A method for retracting a head assembly of a disk drive, said method comprising:

providing a booster circuit, a condenser, and a control circuit to a disk drive;

charging said condenser via a boosted supply voltage provided by said booster circuit when a power supply for said disk drive is turned on; and in response to said power supply for said disk drive being turned off, discharging said condenser by said control circuit to supply a discharge current to a coil within a head actuator of said disk drive to retract a head assembly of said disk drive such that said head assembly is retracted even after said power supply has been turned off.

12. The method of claim 11, wherein said method further includes providing crash stops for determining a swivelling range of said head assembly, and wherein each of said crash stops has a rebound modulus of 0.8 or less at the time when said head assembly bumps one of said crash stops.

13. The method of claim 11, wherein said method further includes setting a delay time for damping any angular momentum caused by an inertia of said head assembly before discharging of said condenser.

14. The method of claim 11, wherein said boosted voltage is approximately three times of said power supply voltage.

* * * * *